United States Patent
Futami

(10) Patent No.: US 6,174,433 B1
(45) Date of Patent: Jan. 16, 2001

(54) HOUSEHOLD WASTEWATER PURIFICATION SYSTEM

(75) Inventor: Osamu Futami, Aira-gun (JP)

(73) Assignee: Kyoei Plumbing Co., Ltd., Kogoshima (JP)

(*) Notice: Under 35 U.S.C. 154(b), the term of this patent shall be extended for 0 days.

(21) Appl. No.: 09/292,921

(22) Filed: Apr. 16, 1999

(30) Foreign Application Priority Data

Apr. 17, 1998 (JP) .................................................. 10-107888

(51) Int. Cl.[7] .............................................................................
   ............................................. C02F 9/00; C02F 1/68

(52) U.S. Cl. ................... 210/195.3; 210/197; 210/221.2; 210/264; 210/284; 210/763

(58) Field of Search ....................................... 210/748, 605, 210/630, 623, 615, 616, 807, 264, 284, 221.2, 195.3, 197, 763

(56) References Cited

U.S. PATENT DOCUMENTS

| 5,061,369 | * | 10/1991 | Romero | 210/170 |
| 5,294,315 | * | 3/1994 | Cooper | 210/748 |
| 5,501,801 | * | 3/1996 | Zhang | 210/748 |

* cited by examiner

*Primary Examiner*—Chester T. Barry
(74) *Attorney, Agent, or Firm*—Armstrong, Westerman, Hattori, McLeland & Naughton

(57) ABSTRACT

A household wastewater purification system includes a first treatment tank having a household wastewater inlet in an upper part thereof, a photocatalytic decomposition treatment device having a photocatalytic material at least a part of which lies above the water surface, and an anaerobic treatment device. A second treatment tank is adjacent to the first treatment tank and isolated therefrom by a partition wall except a lower part thereof that is communicated with a lower part of the first treatment tank. The second treatment tank has an aerobic treatment device therein and a purified water outlet in an upper part thereof. A light-introducing part is provided above the first treatment tank.

9 Claims, 2 Drawing Sheets

HOUSEHOLD WASTEWATER PURIFICATION SYSTEM

TECHNICAL FIELD

The present invention relates to a purification system for household wastewater. More particularly, the present invention relates to a household wastewater purification system with a photocatalytic decomposition treatment device having a photocatalytic material.

BACKGROUND OF THE INVENTION

Hitherto, in an area lacking an adequate sewage system, general household wastewater is discharged untreated into the natural environment as it is. This is a great cause of environmental, disruption.

Under these circumstances, recently, a combined wastewater purifier has become known which comprises three tanks, i.e. a settling tank for receiving and settling wastewater, a septic tank (anaerobic settling tank), and an aerobic biological treatment tank.

However, the combined wastewater purifier is generally a large-sized wastewater purifier and needs a wide site for installation. In addition, it is necessary to provide a separate flush toilet wastewater purifier, or the like, as installed at present. Therefore, the combined wastewater purifier suffers from the problem that it costs a great deal.

SUMMARY OF THE INVENTION

The present inventor conducted studies in order to solve the above-described problem and, as a result, succeeded in dispensing with a large-scale anaerobic septic tank and settling tank, making the whole wastewater purifier extremely small in size and increasing the wastewater purification efficiency, resulting in the proposition of a household wastewater purification system according to the present invention.

That is, the present invention provides:

(1) a household wastewater purification system including a first treatment tank having a household wastewater inlet in an upper part thereof, a photocatalytic decomposition treatment device having a photocatalytic material, at least a part of which lies above the water surface, and an anaerobic treatment device, the household wastewater purification system further including a second treatment tank adjacent to the first treatment tank and isolated therefrom by a partition wall, except for a lower part thereof that is communicated with a lower part of the first treatment tank, the second treatment tank having an aerobic treatment device therein and a purified water outlet in an upper part thereof, wherein a light-introducing part is provided above the first treatment tank;

(2) a household wastewater purification system as set forth in (1), wherein the light-introducing part is a light-transmitting cover;

(3) a household wastewater purification system as set forth in (1) or (2), wherein the anaerobic treatment device in the first treatment tank has an anaerobic microorganism-implanted carrier consisting essentially of charcoal;

(4) a household wastewater purification system as set forth in any of (1) to (3), wherein a basket for removing bulky foreign substances is provided in the upper part of the first treatment tank;

(5) a household wastewater purification system as set forth in any of (1) to (4), wherein the aerobic treatment device in the second treatment tank has an air diffuser and an aerobic microorganism-implanted carrier provided above the air diffuser;

(6) a household wastewater purification system as set forth in any of (1) to (5), wherein an air lifter is erected to supply sediment deposited in the bottom of the household wastewater purification system to the upper part of the first treatment tank, the air lifter consisting essentially of a pipe having a suction port at the bottom of the household wastewater purification system and a discharge port to the first treatment tank at an upper end thereof, the pipe further having an air inlet at an intermediate portion thereof;

(7) a household wastewater purification system as set forth in (6), wherein an air pipe connected to the air inlet of the air lifter is provided to branch off from a main air pipe connected to the air diffuser in the second treatment tank;

(8) a household wastewater purification system as set forth in any of (1) to (6), wherein an air pipe is installed in a lower part of the photocatalytic decomposition treatment device so that substances attached to the photocatalytic material are removed by underwater bubbling of a gas; and (9) a household wastewater purification system as set forth in (8), wherein the air pipe for removing the substances from the photocatalytic material in the photocatalytic decomposition treatment device by underwater bubbling of a gas is provided to branch off from the main air pipe connected to the air diffuser in the second treatment tank.

Figure 1:
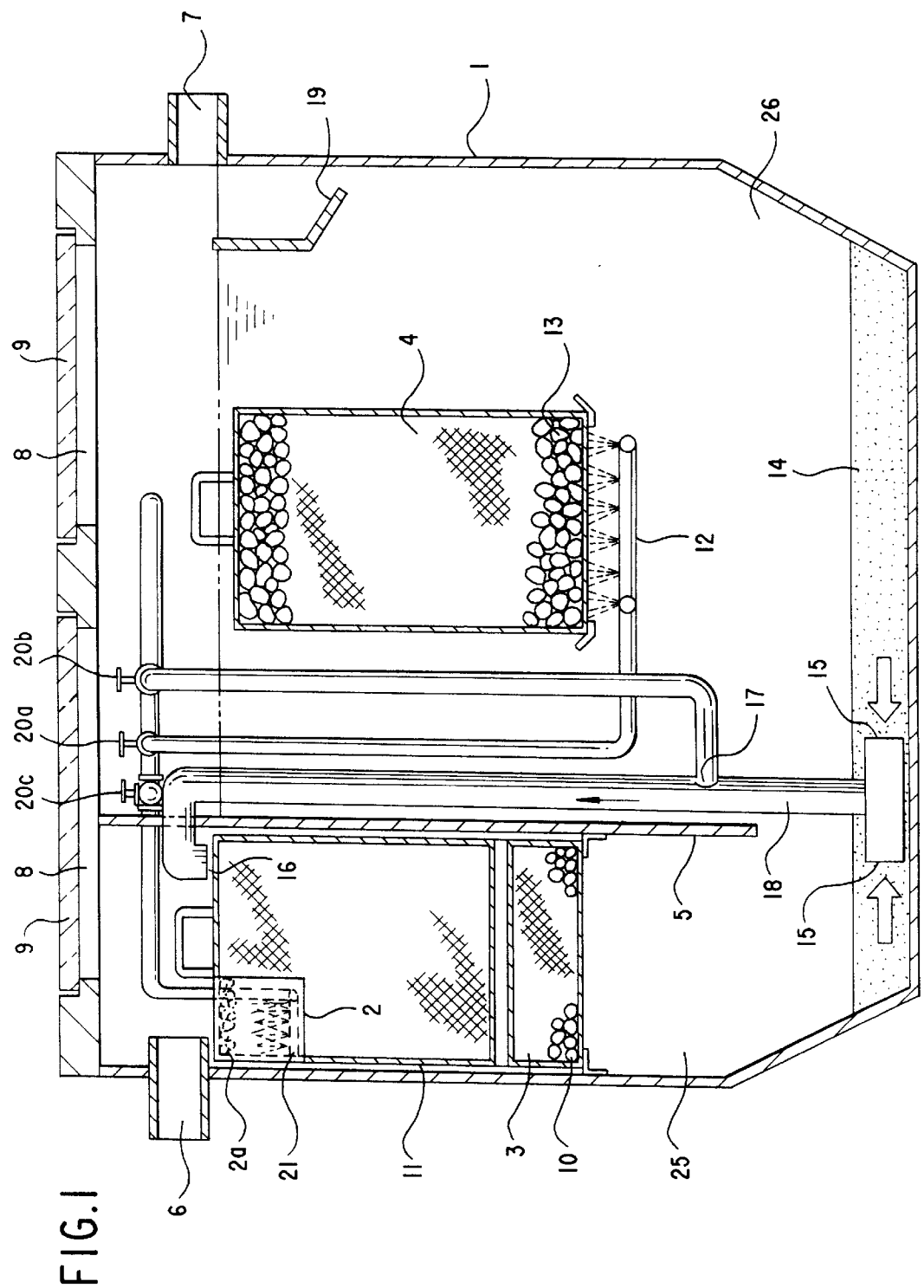
FIG. 1 is a side view of a household wastewater purification system according to an embodiment of the present invention.

Explanation of reference numerals in the figures:
1: wastewater purifier
2: photocatalytic decomposition treatment device
2a: photocatalytic material
3: anaerobic treatment device
4: aerobic treatment device
5: partition wall
6: wastewater inlet
7: purified water outlet
8: light-introducing part
9: cover
10: anaerobic microorganism-implanted carrier
11: basket
12: air diffuser
13: aerobic microorganism-implanted carrier
14: sediment
15: suction port
16: discharge port
17: air inlet
18: air lifter
19: shielding plate
20a, 20b, 20c: switching valves 21: aerator
25: first treatment tank
26: second treatment tank
27: air pump

BEST MODE FOR CARRYING OUT THE INVENTION

Photocatalytic materials usable in the present invention are those which are publicly known. However, titanium oxide, which is a semiconductor, is principally used.

The principle of a photocatalyst is as follows. When a semiconductor is irradiated with light of a wavelength having an energy exceeding the bandgap (forbidden band) of the semiconductor, electrons in the valence band are excited to move to the conduction band by absorbing the light energy, causing electron-hole pairs to be generated in the semiconductor. The electrons and holes move extendedly to the surface of the semiconductor and react a substance adsorbed on the surface.

On the surface of titanium oxide, for example, both a reductive reaction by electrons and an oxidative reaction by holes take place. However, the feature of titanium oxide as a photocatalyst resides in that the holes have strong oxidizing power.

The photocatalytic decomposition treatment device is a decomposition treatment device in which the above-described photocatalytic material is placed. For example, the photocatalytic treatment device is filled with a photocatalytic material formed from a titanium oxide photocatalyst attached to the surfaces of hollow glass beads as a carrier so that the photocatalytic material floats on water.

In the present invention, the light-introducing part provided at the top is, for example, a light-transmitting cover provided on a ground-surface portion at the top of the system according to the present invention that is buried in the ground. Thus, the photocatalytic material in the photocatalytic decomposition treatment device can exhibit a photolytic action by light applied thereto through the light-transmitting cover.

It is particularly preferable for the light-transmitting cover to be formed from an ultraviolet ray-transmitting material so that the photocatalytic material can exhibit a decomposing action satisfactorily. For example, the light-transmitting cover may be formed by using quartz glass.

The anaerobic treatment device is a device that decomposes organic matter by anaerobic microorganisms (microorganisms in which metabolic processes proceed without the need of molecular oxygen). Principally, decomposition treatment by methane fermentation is carried out. Carbohydrates, fats, proteins, etc. are finally decomposed to $CH_4$ and $CO_2$.

This treatment is generally used as a pretreatment for aerobic treatment.

The anaerobic microorganism-implanted carrier is a carrier for implanting and multiplying anaerobic microorganisms. For the carrier, crushed stone, plastics, sand, anthracite, etc. are used. However, it is desirable in the present invention to use charcoal, activated coconut shell charcoal, and so forth, which are less costly and durable.

Charcoal is highly adsorptive and also has a deodorizing effect. In addition, after use, charcoal can be reused as a soil conditioner or an organic fertilizer. Moreover, charcoal has no adverse effect on the environment.

Next, the aerobic treatment device is a device that decomposes organic matter by aerobic microorganisms (microorganisms in which metabolic processes proceed in the presence of molecular oxygen). In this device, the greater part of organic contaminants are decomposed, and purified water is produced. The purified water is further purified by the shielding plate and then discharged from the purified water outlet.

In addition, an air lifter is employed to supply sediment deposited in the bottom of the household wastewater purification system to the first treatment tank to subject the sediment to decomposition treatment again. The air lifter may be formed from an erect pipe having a discharge port communicating with the first treatment tank at the upper end thereof and a suction port at the lower end thereof and further having an air inlet at an intermediate portion thereof. The above-described air is supplied through a branch pipe provided to branch off from the main air pipe for supplying air that is diffused into the aerobic treatment device in the second treatment tank. It should be noted that it is preferable to provide a switching valve, an on-off valve with a regulating valve, etc. in the vicinity of the point at which the branch pipe branches off from the main air pipe, thereby making it possible to control the supply of air to the air lifter, the air pipe in the lower part of the photocatalytic decomposition treatment device, or the air diffuser in the second treatment tank by controlling the on-off operation or opening of the valves.

EMBODIMENT

An embodiment of the present invention will be described with reference to the drawings.

Figure 2:
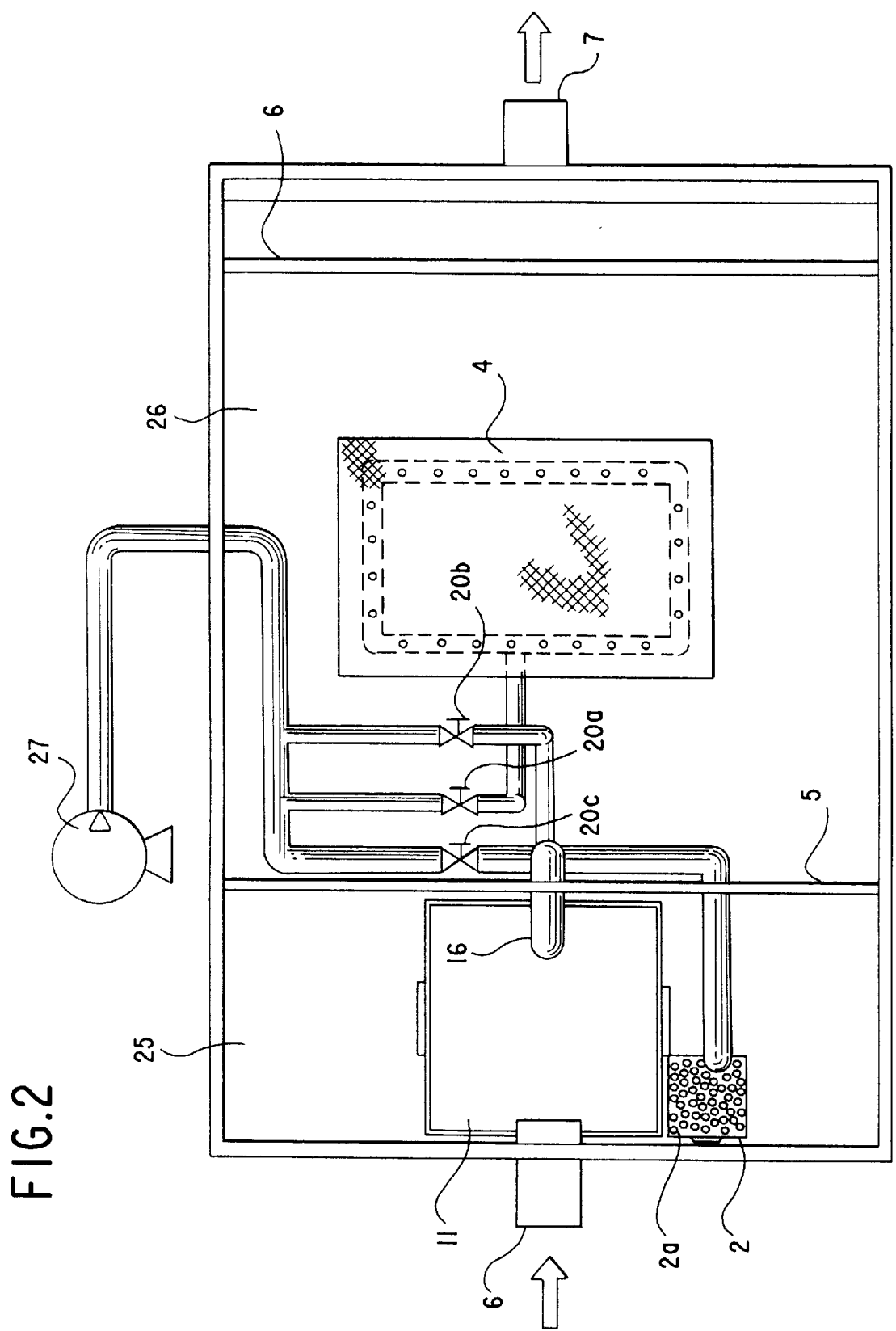
FIG. 2 is a plan view of the household wastewater purification system shown in FIG. 1.

FIG. 1 is a side view of the household wastewater purification system according to the present invention, and FIG. 2 is a plan view thereof.

In the figures: reference numeral 1 denotes a wastewater purifier; 2 a photocatalytic decomposition treatment device; 3 an anaerobic treatment device; and 4 an aerobic treatment device.

In FIG. 1, a wastewater purifier 1 is provided with a first treatment tank 25 having a wastewater inlet 6 in an upper part thereof. The first treatment tank 25 is provided with a photocatalytic decomposition treatment device 2 having a photocatalytic material 2a at least a part of which floats on the water surface. The first treatment tank 25 is further provided with an anaerobic treatment device 3. The wastewater purifier 1 is further provided with a second treatment tank 26 having a purified water outlet 7 in an upper part thereof. The second treatment tank 26 is provided with an aerobic treatment device 4. The wastewater purifier 1 is further provided with a partition wall 5.

On the top of the wastewater purifier 1, a light-transmitting cover 9 is installed over a light-introducing part 8. In addition, an air lifter 18 is erected in the wastewater purifier 1 to supply sediment 14 deposited in the bottom of the wastewater purifier 1 to a discharge port 16 in the upper part of the first treatment tank 25.

It should be noted that air can be supplied to an air diffuser 12 in the second treatment tank 26 through a switching valve 20a, and air can be supplied to an air diffuser 21 located in the upper part of the first treatment tank 25 through a switching valve 20c.

FIG. 2 is a plan view of the household wastewater purification system according to the present invention. In the first treatment tank 25, a basket 11 and the photocatalytic decomposition treatment device 2 are installed. In the second treatment tank 26, the aerobic treatment device 4 is provided, and the switching valves 20a, 20b and 20c are provided for these devices through the main air pipe from an air pump 27.

Next, the operation of the household wastewater purification system according to the present invention will be described with reference to FIG. 1.

First, household wastewater flows into the wastewater purifier 1 from the wastewater inlet 6, and bulky foreign substances are removed in the basket 11.

Oily matter of small specific gravity, dirt, other organic matter, and so forth, collect in the top of the first treatment tank 25 and are decomposed by a large number of pieces of floating photocatalytic material 2a introduced into the photocatalytic decomposition treatment device 2.

The floating photocatalytic material 2a comprises hollow spherical pieces of glass carrying a titanium oxide photocatalyst on their surfaces. The large number of pieces of photocatalytic material 2a are occasionally subjected to underwater bubbling by releasing bubbles from the lower part of the photocatalytic decomposition treatment device 2 through the aerator 21 in order to separate and remove decomposition products from the surfaces of pieces of photocatalytic material 2a and to remove dirt from the surfaces, or to allow the large number of pieces of photocatalytic material 2a to reveal their fresh surfaces and to collide with each other so as to clean the surfaces.

Sediment 14 settled and deposited in the bottom of the first treatment tank 25 is sucked into the suction port 15 by air sent into the air lifter 18 by opening the switching valve 20b, and the sucked sediment 14 is supplied to the discharge port 16 at the upper end.

Thereafter, the wastewater is purified in the anaerobic treatment device 3 by the anaerobic microorganisms multiplied on the charcoal of the anaerobic microorganism-implanted carrier 10.

Furthermore, wastewater purified by the aerobic microorganisms in the second treatment tank flows toward the purified water outlet 7 located in the upper part of the second treatment tank, and the flow of purified water is made static by the shielding plate 19. Then, the supernatant portion of the purified water flows out.

The present invention described above exhibits the following operation/working-effects:

(1) By providing a photocatalytic decomposition treatment device having a photocatalytic material, it is possible to decompose and settle oily matter, dirt and other organic matter floating in the top of the first treatment tank. Therefore, there is no need of a large-scale anaerobic septic tank and settling tank. Thus, the whole wastewater purifier, including the first treatment tank, can be made extremely small in size.

(2) By forming a light-introducing part from a light-transmitting cover, sunlight can be efficiently introduced from the outside world. Accordingly, it is possible to expect an effective reaction of the photocatalytic material in the photocatalytic decomposition treatment device with substances adsorbed on the surface thereof.

(3) Charcoal used as an implantation carrier for anaerobic microorganisms is highly adsorptive and also durable. In addition, charcoal can be reused by incinerating substances attached thereto. Accordingly, the maintenance cost is low.

(4) By providing a basket for removing bulky foreign substances, bulky foreign substances collect in the basket. Accordingly, it is possible to reduce the load of treatment imposed on the anaerobic and aerobic treatment devices. Moreover, after-treatment can be carried out by anyone because it can be done simply by removing and cleaning the basket.

(5) In the aerobic treatment device in the second treatment tank, an air diffuser is provided underneath the aerobic microorganism-implanted carrier to send air. By doing so, the multiplication of aerobic microorganisms can be activated. Thus, the treating effect improves.

(6) Sediment deposited in the bottom of the household wastewater purification system is supplied to the first treatment tank by the air lifter. Consequently, the sediment is adsorbed on charcoal as an anaerobic microorganism-implanted carrier. Therefore, for treatment of the sediment, it is only necessary to dispose of the charcoal or to incinerate the sediment to thereby reuse the charcoal, and no cleaning specialist or the like is needed. Thus, maintenance is easy.

(7) By allowing air to be supplied to the air diffuser in the second treatment tank through a switching valve, air can be supplied as desired.

(8) Substances attached to the photocatalytic material can be surely removed by subjecting the photocatalytic material to underwater bubbling of a gas. Accordingly, it is easy to maintain the photocatalytic effect.

(9) By supplying air to the photocatalytic decomposition treatment device through a switching valve, substances attached to the photocatalytic material can be removed, and it is possible to carry out decomposition treatment without weakening the effect of the photocatalytic material.

What is claimed is:

1. A household wastewater purification system comprising:
    a first treatment tank having a household wastewater inlet in an upper part thereof, a photocatalytic decomposition treatment device having a photocatalytic material at least a part of which lies above a water surface, and an anaerobic treatment device; and
    a second treatment tank adjacent to the first treatment tank, said second treatment tank being isolated from the first treatment tank by a partition wall except a lower part thereof that is communicated with a lower part of the first treatment tank, said second treatment tank having an aerobic treatment device therein and a purified water outlet in an upper part thereof;
    wherein a light-introducing part is provided above the first treatment tank.

2. A household wastewater purification system according to claim 1, wherein the light-introducing part is a light-transmitting cover.

3. A household wastewater purification system according to claim 1 or 2, wherein the anaerobic treatment device in the first treatment tank has an anaerobic microorganism-implanted carrier consisting essentially of charcoal.

4. A household wastewater purification system according to claim 3, wherein a basket for removing bulky foreign substances is provided in the upper part of the first treatment tank.

5. A household wastewater purification system according to claim 4, wherein the aerobic treatment device in the second treatment tank has an air diffuser and an aerobic microorganism-implanted carrier provided above the air diffuser.

6. A household wastewater purification system according to claim 5, wherein an air lifter is erected to supply sediment deposited in a bottom of the household wastewater purification system to the upper part of the first treatment tank, said air lifter consisting essentially of a pipe having a suction port at said bottom and a discharge port to said first treatment tank at an upper end thereof, said pipe further having an air inlet at an intermediate portion thereof.

7. A household wastewater purification system according to claim 6, wherein an air pipe connected to the air inlet of the air lifter is provided to branch off from a main air pipe connected to the air diffuser in the second treatment tank.

8. A household wastewater purification system according to claim 6, wherein an air pipe is installed in a lower part of the photocatalytic decomposition treatment device so that substances attached to the photocatalytic material are removed by underwater bubbling of a gas.

9. A household wastewater purification system according to claim 8, wherein the air pipe for removing the substances from the photocatalytic material in the photocatalytic decomposition treatment device by underwater bubbling of a gas is provided to branch off from a main air pipe connected to the air diffuser in the second treatment tank.

* * * * *